UNITED STATES PATENT OFFICE.

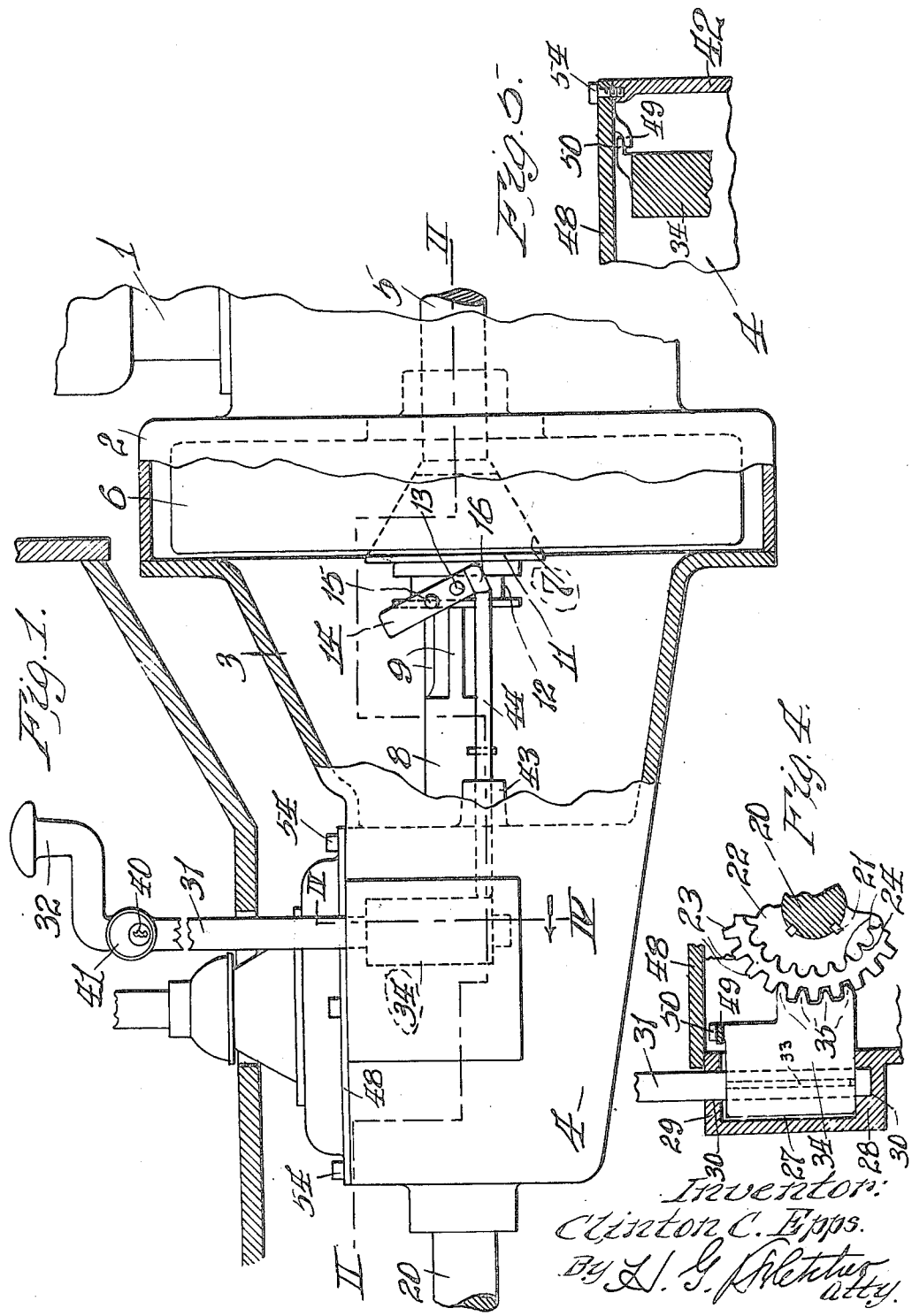

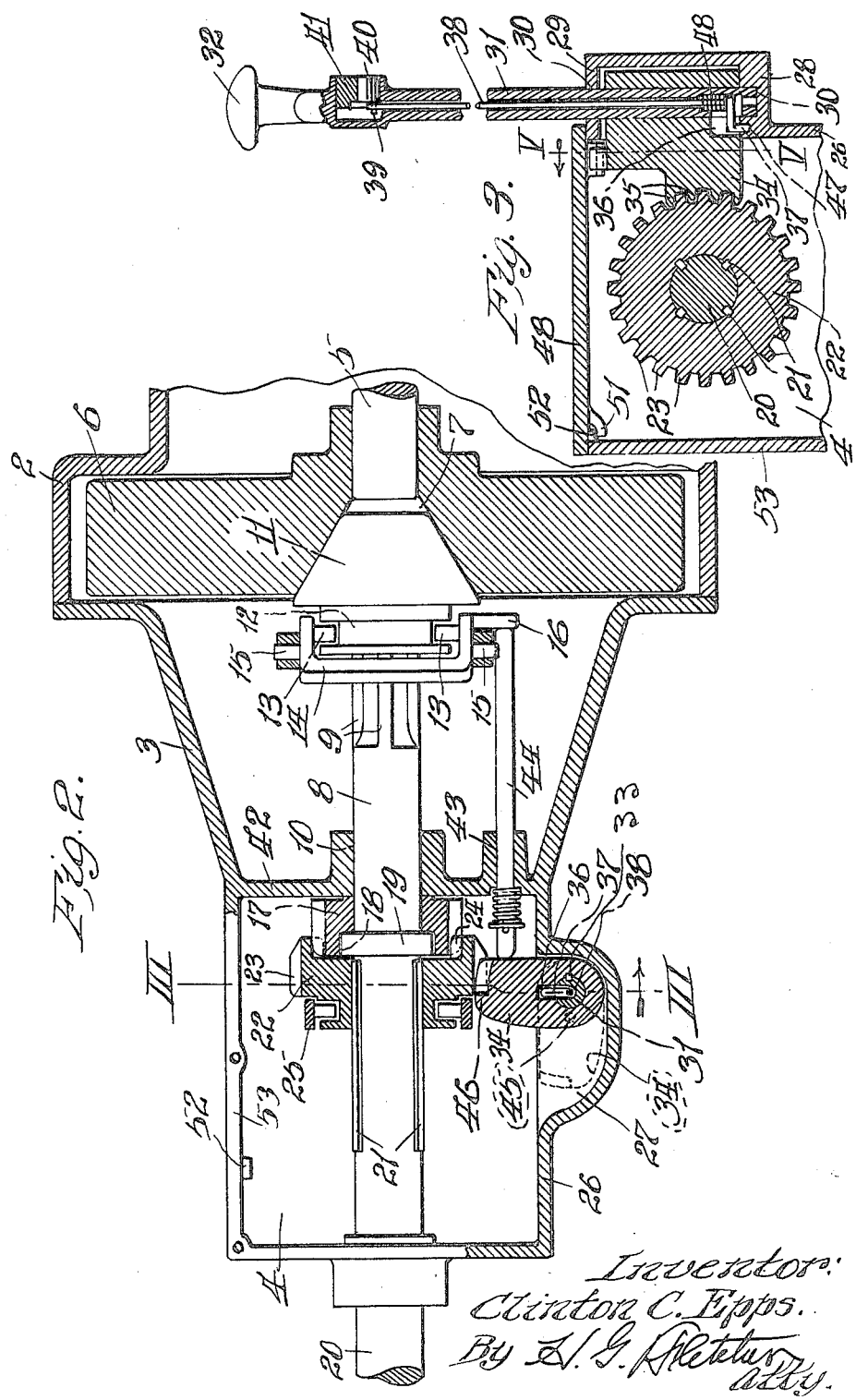

CLINTON C. EPPS, OF BRISTOW, OKLAHOMA.

LOCKING DEVICE FOR VEHICLES.

1,376,085. Specification of Letters Patent. Patented Apr. 26, 1921.

Application filed May 5, 1919. Serial No. 294,736.

*To all whom it may concern:*

Be it known that I, CLINTON C. EPPS, a citizen of the United States of America, and a resident of Bristow, in the county of Creek and State of Oklahoma, have invented certain new and useful Improvements in Locking Devices for Vehicles, of which the following is a specification.

The primary object of this invention is to provide an improved locking mechanism for locking the power transmitting parts of an automobile driving mechanism.

Another object is to provide an improved locking device for locking the transmission gearing of a self propelled vehicle.

A further object is in providing an improved locking device which while locking the transmission gearing against movement will also prevent the driving clutch from being withdrawn from clutching position relative to the motor of a vehicle so that the motor cannot be started.

Other and further objects will appear in the specification and be specifically pointed out in the appended claims, reference being had to the accompanying drawings exemplifying the invention, and in which, Figure 1 is a fragmentary side elevation, partly in section, showing portions of an internal combustion motor and the power transmitting parts related thereto.

Fig. 2 is a horizontal section taken approximately on the line II—II of Fig. 1.

Fig. 3 is a fragmentary transverse section taken on the line III—III of Fig. 2.

Fig. 4 is a fragmentary vertical section taken on the line IV—IV of Fig. 1.

Fig. 5 is a fragmentary vertical section taken on the line V—V of Fig. 3.

As already stated in the aforementioned objects, this improved invention pertains to the locking of the power transmitting parts of a self propelled vehicle so that the vehicle cannot be moved by an unauthorized person, and in order to disclose the co-operative relation of the locking device to the transmitting parts with reference to the drawings, a motor 1 is shown, having the usual fly wheel housing 2, and secured to said housing rearwardly thereof is the clutch housing 3, and formed integral with the clutch housing is the transmission casing 4. Extending from the motor 1 into the fly wheel housing 2 is the motor power or crank shaft 5, and mounted on said shaft is the fly wheel 6 having a centrally arranged clutching mouth 7. Alining with the motor shaft 5 is a clutch shaft 8, having the usual keys 9 formed integral therewith, said shaft at one end extending into the transmission gearing case 4 and being supported in a bearing 10.

Slidably mounted on the keys 9 of the clutch shaft 8 is a clutch 11, and in engagement with the annular recess 12 of said clutch are a pair of opposing pins 13 which are carried by a yoke 14, which is swingingly mounted at 15. Formed on the lower end of said yoke adjacent one of the pins 13 is an extending portion 16. Securely mounted to the clutch shaft 8 and located in the transmission casing 4 is a driving pinion 17, said pinion being the first tooth gear in order relative to the train of gearing, not shown, which is contained in the transmission casing 4. Formed in one end of the pinion 17 is a counter bore 18 which is for the reception of an annular shoulder 19 which is secured to the transmission driving shaft 20, said shaft 20 being in alinement with the clutch shaft 8, and carries a plurality of keys 21, said keys being for the reception of a sliding high gear 22 having external teeth 23 and internal teeth 24, said internal teeth being adapted to mesh with the teeth of the pinion 17.

Related to the gear 22 is a shifting mechanism 25. Formed in the vertical wall 26 of the transmission casing 4 is a pocket 27 having a bottom wall 28 and a top wall 29, and formed in each of said walls is a bearing 30, and mounted in said bearings is a vertically extending turnable member 31, having a turning crank 32 formed at its upper end.

Located in the pocket 27 and secured to the member 31 by a key 33 is a gear segment 34, bearing teeth 35 that are adapted to mesh with the teeth 23 of the gear 22.

Formed in the under side of the segment 34 is a recess 36, and mounted in said recess is a locking bolt 37, said bolt being secured to one end of a lifting rod 38 which is reciprocally mounted inside of the turnable member 31, the upper end of said rod being mounted on a lifting pin 39 of the turning drum 40 which forms part of a pin lock 41 which is mounted in the member 31 adjacent the turning crank 32.

Formed in the front wall 42 of the transmission casing 4 is a bearing 43, and reciprocally mounted in said bearing is a spring actuated push rod 44, one end of said push rod extending into said casing, whereas the opposite end of said rod is adapted to engage against the extending portion 16 of the clutch yoke 14.

In the operation of this improved locking device, when the motor and power transmitting parts related thereto are in running condition, the gear segment 34 is located in the pocket 37 of the transmission casing 4, as shown by the dotted lines in Fig. 2.

As is the usual custom with the majority of automobiles, when the motor is stopped and the automobile is to be left standing the power transmitting parts are generally thrown in high gear, in which the gear 22 will be in mesh with the pinion 17, whereas the clutch 11 is in clutching engagement with the fly wheel 6, in which position this improved locking device is adapted to be manipulated. This locking operation is brought about by the operator turning the drum 40 of the pin lock 41 with the key, so that the lifting rod 38 will be moved upwardly, thereby withdrawing the locking bolt 37 from engagement with the socket 45 provided in the bottom wall 28 of the pocket 27, thereby unlocking the gear segment 34 so it can be turned. The turning crank 32, which is located adjacent the operator is then manipulated to the right, thereby turning the teeth bearing end of the gear segment 34 into the transmission casing 4 so that the teeth 35 of said segment will mesh with the teeth 23 of the gear 22, the shoulder 46 of said segment preventing the segment from being turned out of mesh with the gear teeth 23, and will therefore provide a stop for said segment.

In this position of engagement of the segment 34 with the gear 22, the locking bolt 37 will be in alinement with the locking socket or opening 47, which is also formed in the bottom wall 28 of the segment pocket 27, and inasmuch as the lifting rod 38 of said locking bolt is susceptible of being actuated by the spring 48 which is carried by the lower end of the lifting rod 38, the locking bolt 37 will be forced downward into the socket 47, thereby holding the gear segment 34 in locked position relative to the high gear 22, thereby locking the transmission driving shaft 20 against movement.

Incidental with the inward locking movement of the gear segment 34, the extending end of the pushing rod 44 was engaged and moved forward until the opposite end of said rod 44 engaged against the extending portion 16 of the clutch yoke 14, and inasmuch as the clutch 11, which is coöperable with said yoke was previously moved in clutching position relative to the fly wheel 6 of the motor, said yoke will be held in its forwardly moved position by the push rod 44 when the gear segment 34 is in locked meshing position with the high gear 22.

From the aforesaid operation it is therefore to be noted that all of the power transmitting parts of a self propelled vehicle are locked against movement so that the vehicle cannot be moved by an unauthorized person.

While it is to be admitted that the locking of the transmission gearing alone, without the locking of the clutch in its clutching position will lock a vehicle against movement, it has been found desirable to lock the clutch in clutching position as well as the transmission gearing on account of the fact that if the clutch was left unlocked so that it could be moved to a clutching position with the fly wheel of the motor, an unauthorized person could then start the motor, and throw in the clutch, and while the vehicle could not be moved on account of the transmission gearing being locked, injury would be given to the clutch on account of the friction which would be created between the clutch mouth and the fly wheel when the clutch would be thrown into engagement with the fly wheel.

Furthermore, injury might be given to the transmission gearing on account of the over exertion of the power which would be transmitted through the clutch shaft 8 to the transmission.

In order to secure the transmission casing 4 against being tampered with so that the cover plate 48 thereof cannot be removed relative to the casing being entered so as to disengage the gear segment 34 from the gear 22, a depending lip 49 is provided on said cover plate which is adapted to be over engaged by the upwardly extending projection 50 which is carried by a gear segment 34, said lip 49 of the cover plate being engaged by the projection 50 when the segment 34 is moved into meshing position with the gear 22; and for coöperation with the lip 49 of the cover plate, an oppositely disposed depending lip 51 is also provided on said cover plate which is adapted to under engage the projection 52 formed on the wall 53 of the transmission casing 4. This engaging of the projection 50 with the lip 49 of the cover plate will prevent said cover plate from being removed when the device is in locked position, even if the cap screws 54 of the cover plate were removed.

From the aforesaid description of the locking of the cover plate 48, it is obvious that the cover plate can be removed when the gear segment 34 is moved to an unlocked position.

What I claim is:

1. A locking device for the transmission gearing of an internal combustion motor comprising a rotatable member, a turning bar therefor, said member adapted to be swung into engagement with one of the gears of said transmission gearing, a locking bolt carried by said member, and means extending through said bar for operating said locking bolt to secure said member in its operative position.

2. In a locking device, the combination of a transmission gear, a clutch, a member for engagement with the teeth of said gear, means for locking said member in its operative position and means coöperable with said member and said clutch whereby said clutch is prevented from being withdrawn from clutching engagement.

3. In a locking device, the combination of a transmission gear, a clutch and a member for engagement with said gear, said member being rotatably mounted so that it can be moved into meshing engagement with said gear, means for securing said rotatable member in its operative and inoperative positions, and a second member to be actuated by said first mentioned member for engagement with said clutch for holding said clutch against movement.

4. In a locking device, the combination of a power transmitting part, a clutch, a member for engagement with said part, locking means for said member and means coöperable with said member and said clutch whereby said clutch is prevented from being withdrawn from clutching engagement.

5. The combination of a locking device with the transmission gear of an internal combustion motor, said locking device comprising a rotatably mounted gear segment, an operating member for said segment, said gear segment adapted to be swung into engagement with one of the gears of said transmission gearing, a casing for supporting said segment, a locking bolt carried by the segment adapted for engagement with said casing to secure said segment in its adjusted positions and means extending through said operating member for controlling said locking bolt.

6. An arrangement of the class described comprising the combination of a locking device with a transmission gear and clutch, said locking device comprising a rotatably mounted segment, locking means for said segment, a casing for supporting said segment, an operating member for rotating said segment, means independent of said segment and operable by said segment for preventing movement of said clutch when the segment is in its operative position.

7. An arrangement of the class described comprising the combination with a transmission gear and housing of a locking device, said locking device comprising a rotatably mounted segment supported within said housing for engaging said gear, locking means for said segment, a removable cover plate for said housing, an operating member for said rotatable segment, a depending lip formed on said cover plate and means carried by said rotatable segment for engaging said lip when the segment is in its operative position, substantially as and for the purpose set forth.

8. An arrangement of the class described comprising the combination with a transmission gearing and clutch of a locking device, said device comprising a rotatably mounted segment adapted to be swung into engagement with one of the gears of said transmission gearing, locking means for said segment, an operating bar for said segment, a push bar slidably supported with one end adjacent said rotatable segment, means whereby the other end of said push bar engages said clutch, whereby when said rotatable segment is moved to its operative position said push bar is actuated to prevent movement of the clutch, substantially as and for the purpose described.

CLINTON C. EPPS.